United States Patent [19]
Ge et al.

[11] Patent Number: 5,892,558
[45] Date of Patent: Apr. 6, 1999

[54] WIRE ELECTRODE STRUCTURE BASED ON 2 OR 3 TERMINAL DEVICE EMPLOYED IN A LIQUID CRYSTAL DISPLAY

[75] Inventors: Shichao Ge; Yiping Ge, both of San Jose, Calif.

[73] Assignee: GL Displays, Inc., Saratoga, Calif.

[21] Appl. No.: 883,117

[22] Filed: Jun. 26, 1997

[51] Int. Cl.$^6$ .......................... G02F 1/136; G02F 1/1343; G02F 1/135; G02G 3/34

[52] U.S. Cl. ................................. 349/43; 349/41; 349/49; 257/909; 257/8; 257/59; 345/84; 345/90

[58] Field of Search .................................. 349/41, 43, 49, 349/139, 143; 257/926, 909, 8, 41, 44–47, 59, 72; 345/84, 91, 92, 96; 29/604, 622; 438/141, 478; 117/902, 921

[56] References Cited

U.S. PATENT DOCUMENTS

| | | | |
|---|---|---|---|
| 2,915,686 | 8/1959 | Schubert | 29/604 |
| 3,226,269 | 12/1965 | Allegretti et al. | 117/89 |
| 3,382,115 | 9/1961 | Carter et al. | 438/421 |
| 3,514,345 | 5/1970 | Carter et al. | 148/33 |
| 3,849,791 | 11/1974 | Nakashima et al. | 257/787 |
| 4,335,501 | 6/1982 | Wichenden et al. | 257/93 |
| 5,122,889 | 6/1992 | Kaneko et al. . | |
| 5,162,901 | 11/1992 | Shimada et al. . | |
| 5,214,521 | 5/1993 | Kwon et al. . | |
| 5,377,029 | 12/1994 | Lee et al. . | |
| 5,440,411 | 8/1995 | Fujiwara et al. . | |
| 5,499,122 | 3/1996 | Yano . | |
| 5,526,151 | 6/1996 | Miyazaki et al. . | |

FOREIGN PATENT DOCUMENTS

| | | |
|---|---|---|
| 0754961 | 1/1997 | European Pat. Off. . |
| 4-166818 | 6/1992 | Japan . |

OTHER PUBLICATIONS

Patent Abstracts of Japan, vol. 016, No. 463 (P–1428), Sep. 25, 1992 for Japanese Publication No. 04–166818, published Jun. 12, 1992 (abstract).

International Search Report for corresponding International Application No. PCT/US98/11152.

"Development of 25-in. Active–Matrix LCD Using Plasma Addressing for Video–Rate High–Quality Displays," T. Kakizaki et al., *SID 96 Digest,* 1996, pp. 915–918.

(List continued on next page.)

*Primary Examiner*—William L. Sikes
*Assistant Examiner*—Kenneth Parker
*Attorney, Agent, or Firm*—Majestic, Parsons, Siebert & Hsue P.C.

[57] ABSTRACT

An active matrix LCD employs a two-terminal or three-terminal switch structure employing an electrically conductive wire. The wire has an insulating layer thereon forming a wire structure. The wire structure is placed in a groove in a transparent substrate and an electrode layer is deposited on the insulating layer at spaced intervals to form an array of diodes connected in parallel. By applying a suitable voltage to the wire, all of the diodes in parallel are turned on to charge the electrodes to desired electrical potentials on one side of the liquid crystal material. An array of electrodes matching the position of the diodes on the other side of the liquid crystal material are charged to the desired potentials in order to control the color and brightness of the display by controlling the light transmittance of the liquid crystal cells between the two sets of electrodes. In another embodiment, a three-terminal switch device is used instead, where the switch includes an insulating layer on a conductive wire and a semiconductor layer on top of the insulating layer. A conductive layer is then formed on top of the semiconductor layer to provide a source and a drain electrode with the wire acting as the gate of an array of transistors. When the common gate of the transistors is at On potential, the drain electrodes may be charged to the desired potentials in order to control the color and brightness of the display.

29 Claims, 7 Drawing Sheets

OTHER PUBLICATIONS

"A Reflective MIM–Addressed PSCT Display Suited for Video Applications,"0 W. Sautter et al., *Euro Display '96*, 1996, pp. 523–526.

"Improvement of MIM–Addressed Projection Light Valves Using Advanced Electronic Resins," J. Furhmann et al., *SID 96 Digest*, 1996, pp. 603–606.

"Effect of Top Electrode Material on the I–V Characteristics in MIM Elements," T. Nakamura et al., *Asia Display '95*, 1995, pp. 23–26.

"A 10 in. MIM–PDLC Display with Improved MIMs for Higher Voltage," U. Schneider et al., *Asia Display '95*, 1995, pp. 27–30.

Two–Terminal Devices Technologies for AMLCDs, R. Hartman, *SIG 95 Digest*, 1995, pp. 7–10.

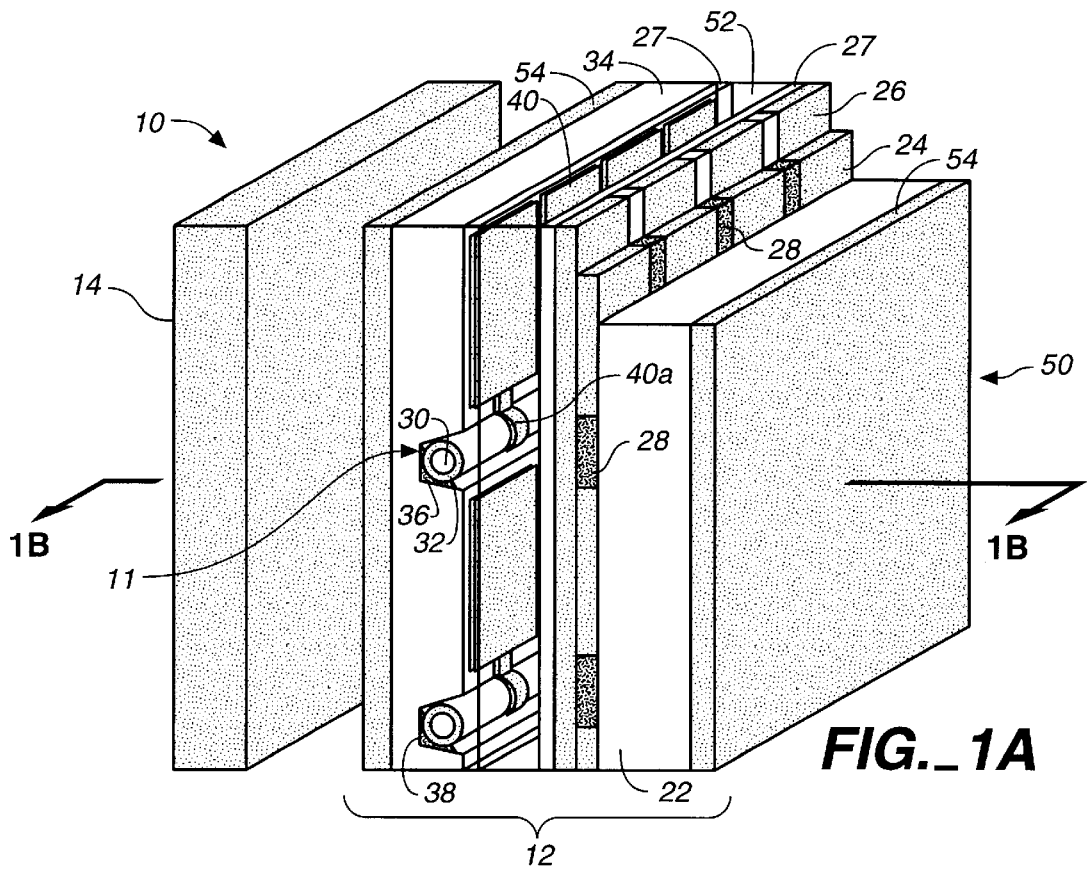
FIG._1A
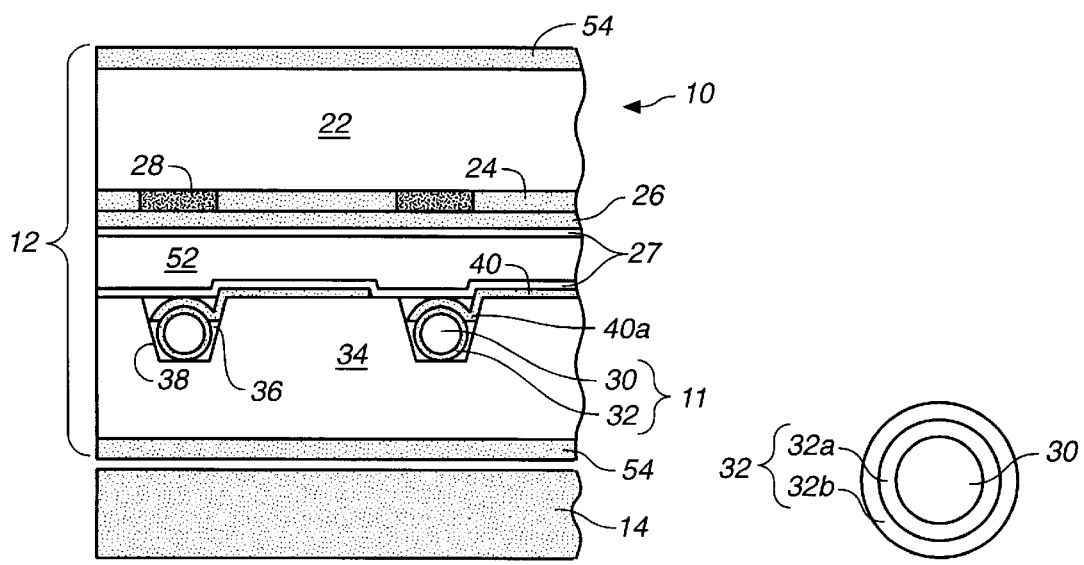
FIG._1B   FIG._1C

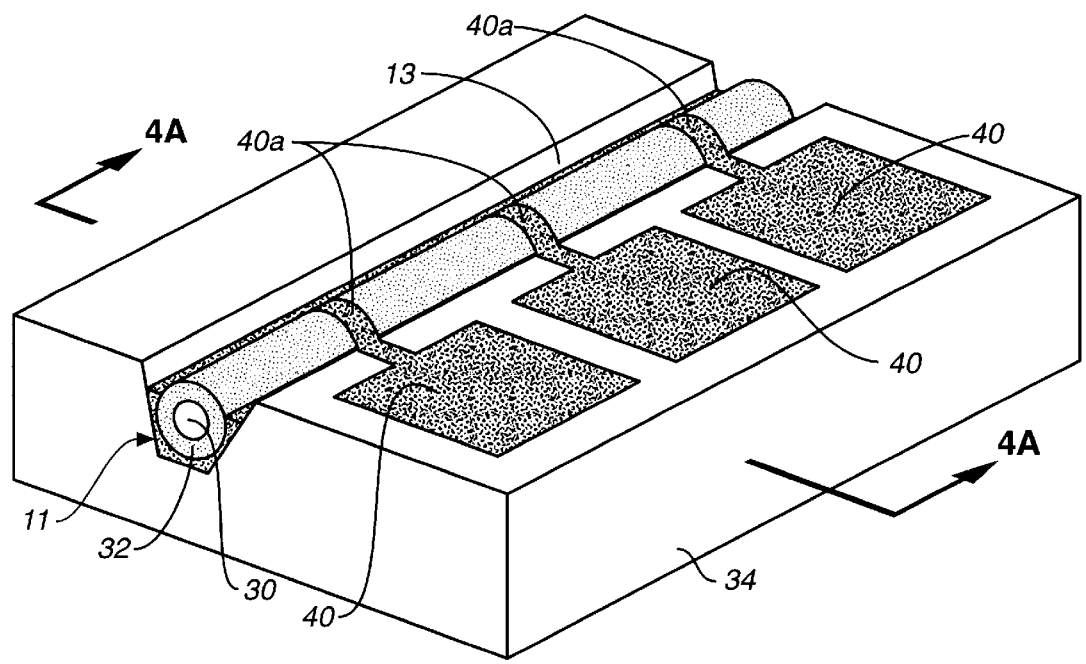
FIG._2A
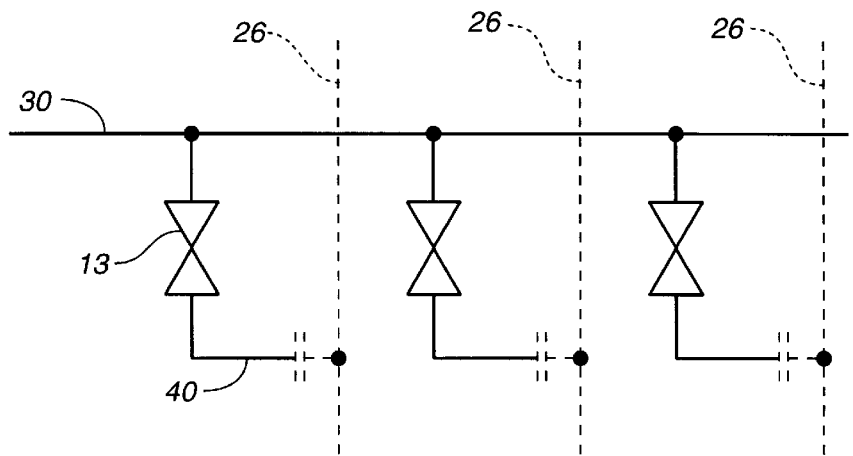
FIG._2B

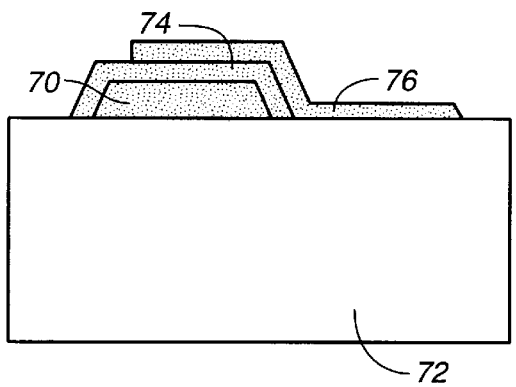
FIG._3
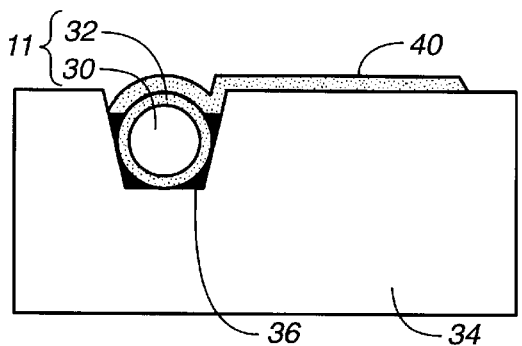
FIG._4A
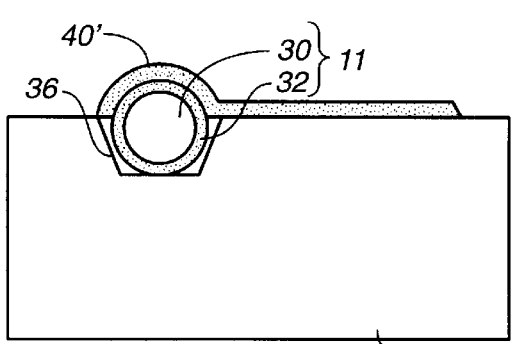
FIG._4B
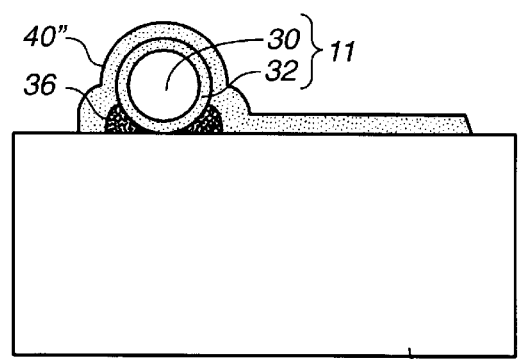
FIG._4C
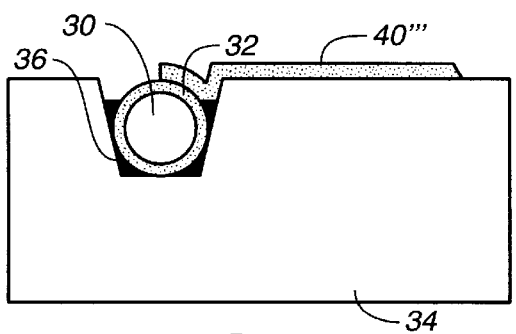
FIG._4D
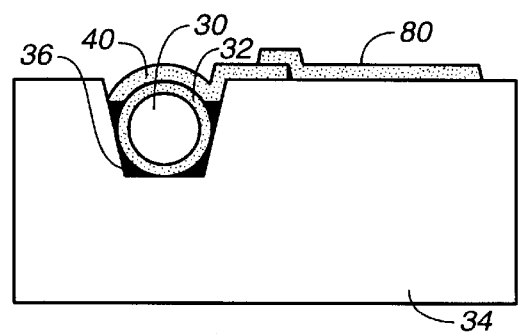
FIG._4E

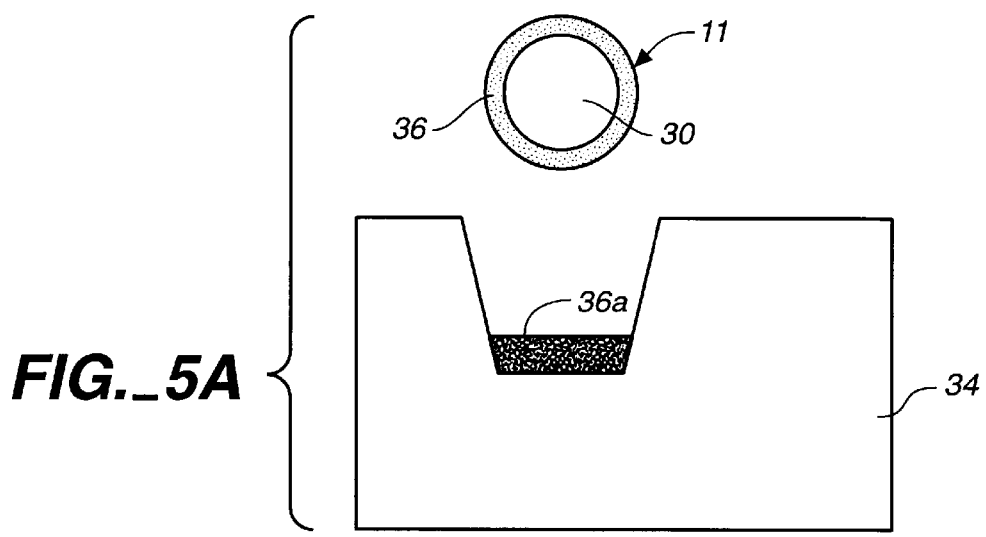
FIG._5A
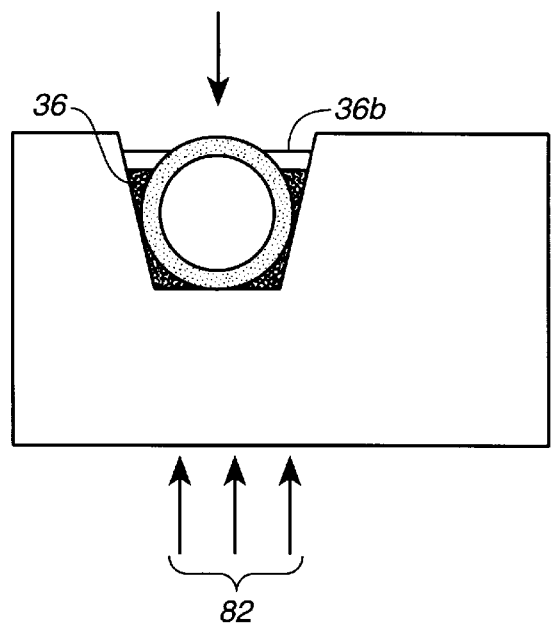
FIG._5B
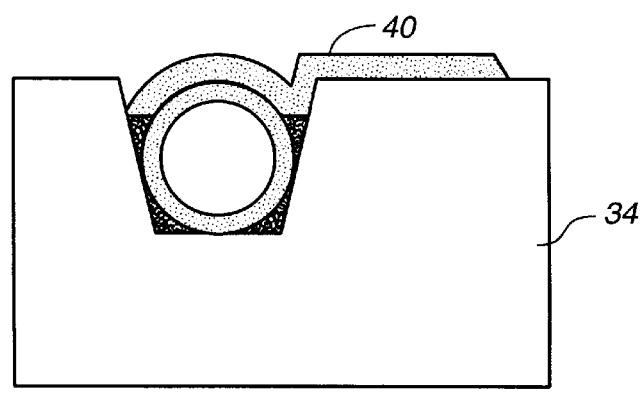
FIG._5C

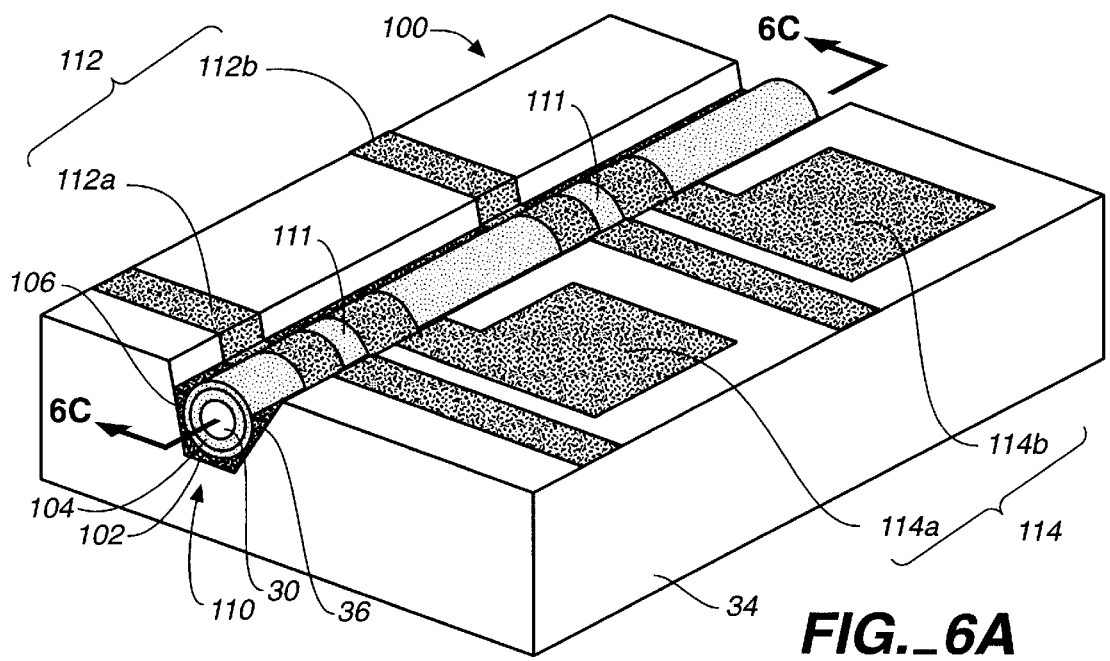
FIG._6A
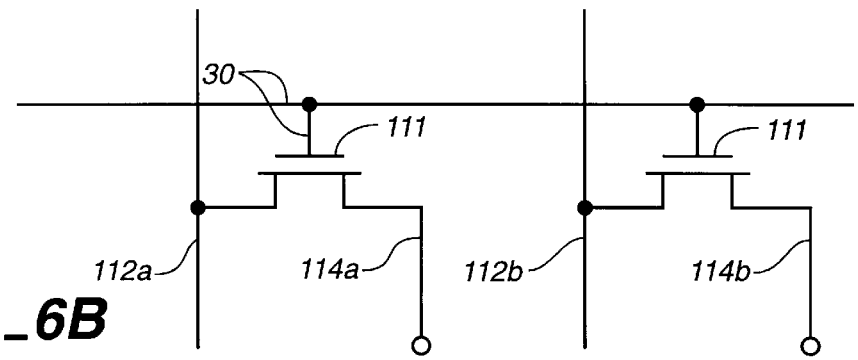
FIG._6B
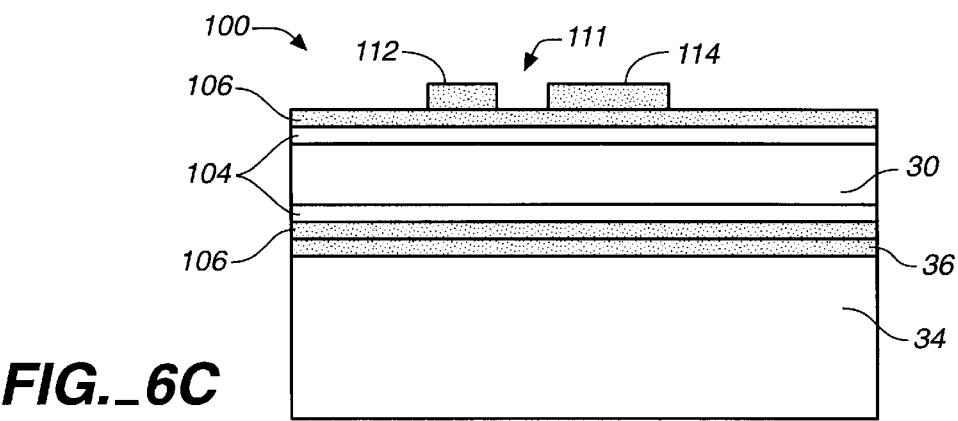
FIG._6C

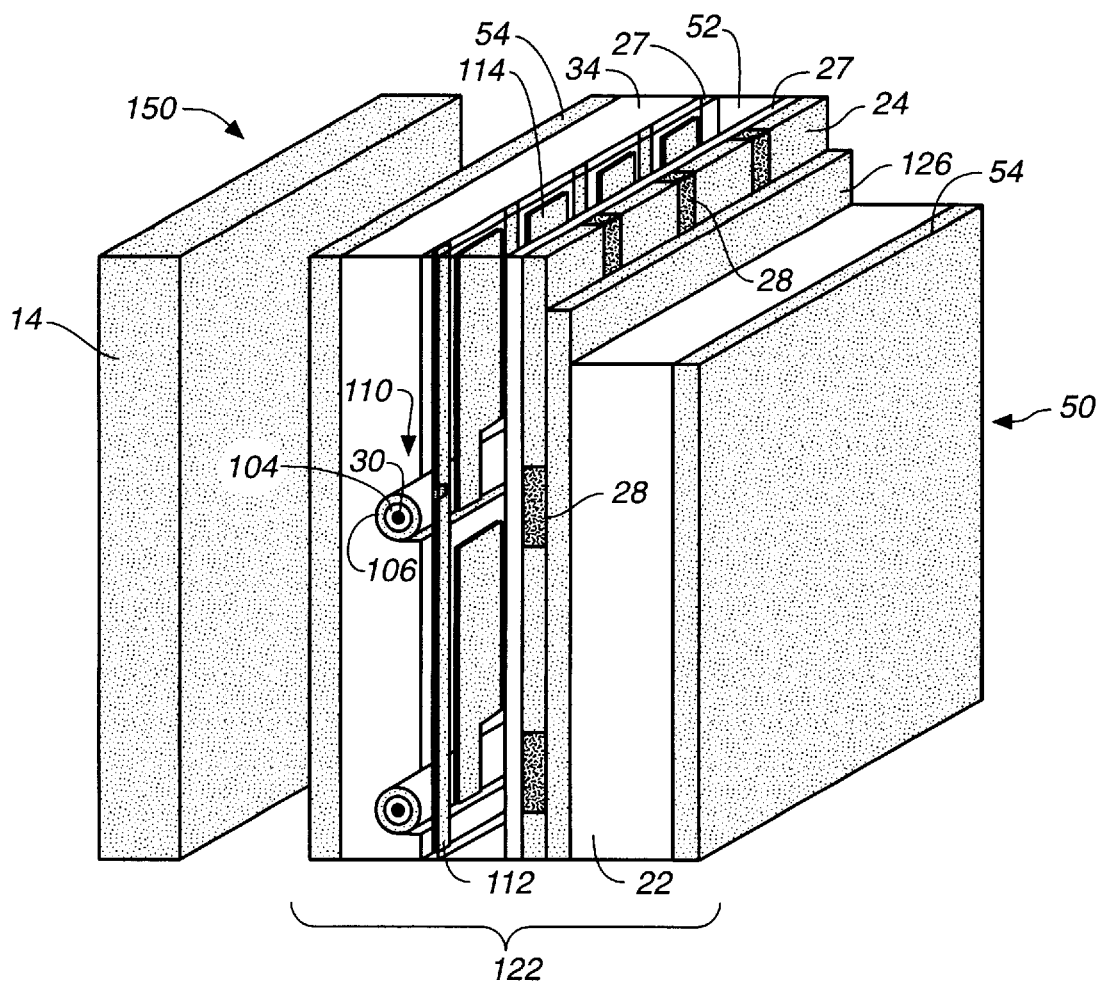
FIG._7

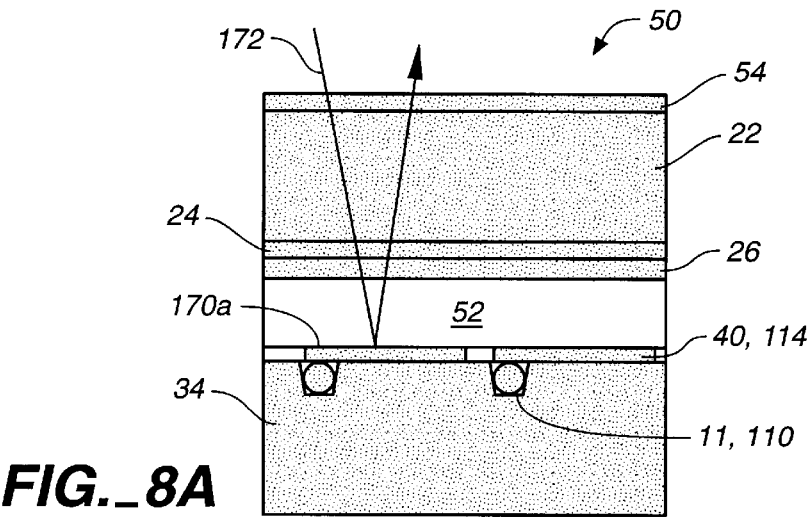
FIG._8A
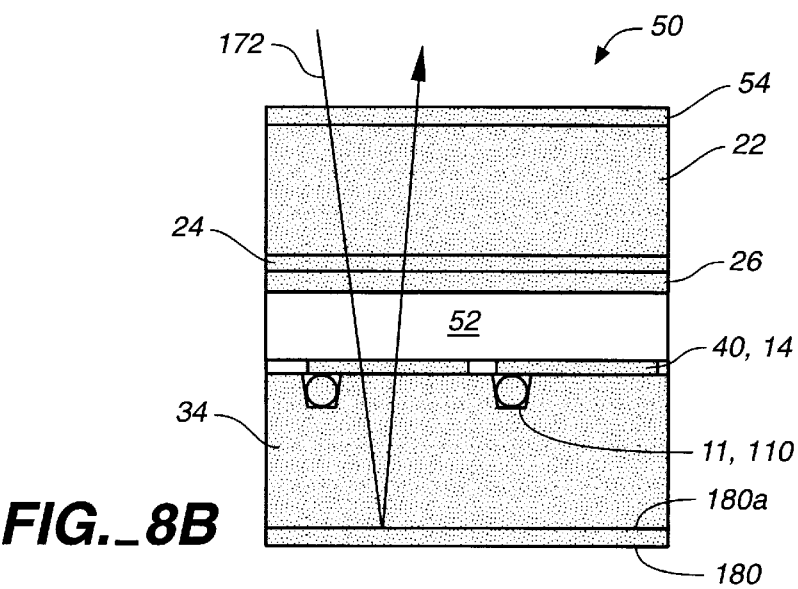
FIG._8B
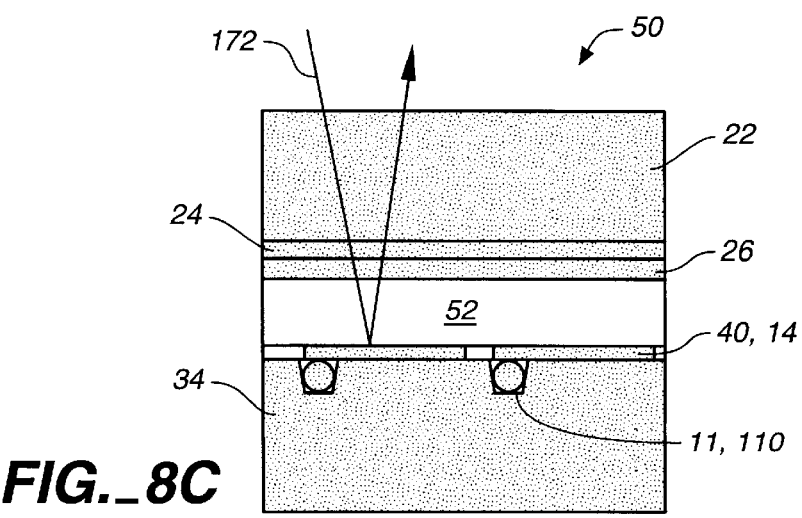
FIG._8C

WIRE ELECTRODE STRUCTURE BASED ON 2 OR 3 TERMINAL DEVICE EMPLOYED IN A LIQUID CRYSTAL DISPLAY

BACKGROUND OF THE INVENTION

This invention relates in general to electrode structures and active matrix liquid crystal displays, and in particular to a wire electrode structure and an active matrix liquid crystal displays employing at least one wire electrode structure for addressing.

The active matrix liquid crystal display (AMLCD), including thin-film transistor liquid crystal display (TFT-LCD) and thin-film diode (e.g. MIM diode) liquid crystal display (TFD-LCD) has been widely used for lap-top computers, small screen televisions and the like. It is currently a mainstream technology of the flat panel display which has a good performance in terms of color gamut, gray scale and resolution.

However, this conventional AMLCD has some limitations and shortcomings. For instance, it is difficult to use the conventional AMLCD for large screen displays, such as those greater than 30 inches diagonally. In addition, it is difficult and costly to manufacture conventional AMLCDs, because of a requirement of many mask steps, high processing cost and high capital investment on equipment involved. Furthermore, conventional AMLCDs usually demonstrate certain drawbacks such as low-brightness and low efficiency due to a low aperture ratio.

In order to overcome the above-described limitations and shortcomings, active matrix liquid crystal displays employing plasma gas discharge addressing have been proposed in the place of thin-film transistor or thin-film diodes. See for example, U.S. Pat. No. 5,214,521 to Kwon et al. As in all AMLCDS, in the device proposed by Kwon et al., light transmittance through liquid crystal (LC) cells is controlled by applying appropriate voltages across a layer of LC material. On one side of the LC layer is an array of electrodes as in the TFT-LCD and TFD-LCD, where each of the electrodes in the array acts as a capacitor plate. On the other side of the layer, however, is a very thin dielectric layer separating the LC layer from an array of gas chambers. By causing plasma gas discharge in the chambers, a surface of the dielectric layer is charged to a desired electrical potential so that such surface acts as a capacitor plate. Such surface of the dielectric layer, together with a matching electrode in the array of electrodes on the other side of the LC layer, then control the light transmittance of the LC cell therebetween.

In order for the above-described plasma gas discharge AMLCD to be feasible, the above-described dielectric layer must be very thin; otherwise, the charges on the surface of the dielectric layer will be ineffective to affect the light transmittance of the LC layer. As described in the '521 patent to Kwon et al., the thin dielectric plate is a thin glass sheet of about 50 microns in thickness.

In order to avoid leakage of the plasma gas in the above-described device proposed by Kwon et al., it is necessary to vacuum seal the gas chambers. Therefore, the above-described thin dielectric layer of Kwon et al. must be able to withstand atmospheric pressure and vacuum sealing. The process for manufacturing a large sheet of very thin glass forming one side of vacuum chambers is very difficult. Furthermore, in order to achieve adequate resolution, the gas chambers for controlling and addressing individual LC cells must be small. In such event, the side walls of the gas chambers would severely limit the aperture ratio of the display, so that only a low percentage of the light from a backlight will be able to penetrate the gas chambers. The display is, therefore, of low efficiency and poor brightness. It is possible to increase the aperture ratio by increasing the size of the gas chamber laterally to the display. This, on the other hand, has the undesirable effect of reducing the resolution of the display. Moreover, the plasma discharge chambers would need to be manufactured under high temperature, which increases the difficulty of alignment and processing costs. The plasma gas discharge AMLCD is operated at high voltages so that expensive driving circuits must be used.

It is, therefore, desirable to provide an improved AMLCD where the above-described difficulties are alleviated.

SUMMARY OF THE INVENTION

This invention is based on the observation that, by using a different type of electrode structure for controlling the addressing of LC cells, the above-described difficulties can be avoided altogether. Instead of fabricating electrically conductive components by masks and etching as in the conventional process for manufacturing AMLCDs, Applicants propose to incorporate an electrically conductive wire electrode structure that can be manufactured separately. This vastly reduces the cost and complexity of manufacture and enables large screen AMLCDs to be made at a reasonable cost. The electrically conductive wire electrode structure is different from a passive wire since the structure is capable of performing switching functions; for this reason the structure is referred to herein as an "active wire electrode structure" or "active wire electrode apparatus."

One aspect of the invention is directed towards an active two-terminal wire apparatus comprising at least one conductive wire; at least one substantially insulating layer and/or at least one semiconductor layer on the surface of said conductive wire; at least one electrode on said first layer, said conductive wire, said layer(s) and said electrode forming a diode; and means for applying a first voltage across said conductive wire and the electrode to turn on the diode, and applying a second voltage across said conductive wire and the electrode to turn off the diode.

Another aspect of the invention is directed towards a three-terminal wire apparatus comprising at least one conductive wire; at least one substantially semiconductor layer and/or at least one insulating layer on the surface of said conductive wire; two electrodes on said at least one substantially semiconductor layer and/or at least one insulating layer, where said conductive wire, said at least one substantially semiconductor layer and/or said at least one insulating layer and said electrodes form a transistor; and means for applying a first voltage to said conductive wire to turn on the transistor, and applying a second voltage to said conductive wire to turn off the transistor.

Yet another aspect of the invention is directed towards a liquid crystal display device, comprising a first layer of liquid crystal material; at least one first electrode on a first side of the liquid crystal layer; at least one conductive wire on a second side of the liquid crystal layer opposite to the at least one first electrode; at least one substantially insulating or semiconductor second layer over said at least one conductive wire; at least one array of electrodes over said second layer, said at least one conductive wire, said second layer and said at least one array of electrodes forming a plurality of switches for altering electrical potential or potentials of the electrode array; and means for turning the switch on and off and for applying an electrical signal to the at least first electrode, to affect light transmittance of the liquid crystal layer.

Yet another aspect of the invention is directed towards a method for making a liquid crystal display, comprising the steps of providing at least one conductive wire; forming a substantially insulating or semiconductor first layer on said at least one wire; attaching said at least one wire and/or the first layer to a substrate; forming an electrode array over said at least one first layer; and placing a liquid crystal second layer and an electrode third layer adjacent to said electrode array.

Still another aspect of the invention is directed towards a liquid crystal display device, comprising a layer of liquid crystal material; at least one electrode on one side of the liquid crystal layer; an array of switches on the side of the liquid crystal layer opposite to the at least one electrode, said switches comprising at least one electrode array and at least one wire coupled to the at least one electrode array; and means for applying electrical potentials to the at least one electrode and the at least one wire.

Yet one more aspect of the invention is directed towards a switching device, comprising an array of switches comprising an electrode array and at least one wire coupled to the array; and means for applying electrical potentials to said electrode array and said at least one wire.

As used in this application, the term "insulating" as applied to a layer of material means that the layer of material is electrically insulating, and the term "conductive" as applied to a wire, layer or material means that the wire, layer or material is electrically conductive.

BRIEF DESCRIPTION OF THE DRAWINGS

FIG. 1A is a side elevational view of a portion of an AMLCD employing a two-terminal wire switch device to illustrate an embodiment of the invention.

FIG. 1B is a cross-sectional view of the device in FIG. 1A along the line 1B—1B in FIG. 1A.

FIG. 1C is a cross-sectional view of a conductive wire with a substantially insulating layer and a semiconductor layer thereon to illustrate an alternative embodiment of the invention.

FIG. 2A is a perspective view of a portion of the switch of the embodiment of FIG. 1A.

FIG. 2B is a schematic circuit diagram representation of the switch in FIG. 2A and of FIG. 1A.

FIG. 3 is a cross-sectional view of a conventional thin-film diode used in conventional AMLCDs.

FIG. 4A is a cross-sectional view of the switch in FIG. 2A along the line 4A—4A in FIG. 2A.

FIGS. 4B–4E are cross-sectional views illustrating four different embodiments of a two-terminal wire switch that can be used in the embodiment of FIGS. 1A, 1B.

FIG. 5 is a cross-sectional view of the different components in different stages in a fabrication process for making the switch of FIG. 4A.

FIG. 6A is a perspective view of a portion of a three-terminal switch which can be used in place of the two-terminal switch of FIGS. 2A, 4A to illustrate another embodiment of the invention.

FIG. 6B is a schematic view of the equivalent circuit of the three-terminal wire switch of FIG. 6A.

FIG. 6C is a cross-sectional view of the three-terminal switch portion of FIG. 6A along the line 6C—6C in FIG. 6A.

FIG. 7 is a side elevational view of an AMLCD employing the three-terminal switch of FIGS. 6A–6C to illustrate an alternative embodiment of the invention.

FIGS. 8A–8C are cross-sectional views of an AMLCD to illustrate yet another alternative embodiment of the invention.

For ease of description, identical components are labelled by the same numerals in this application.

DETAILED DESCRIPTION OF THE PREFERRED EMBODIMENT

FIG. 1A is an elevational view of a portion of an AMLCD 10 employing a two-terminal active wire switch device to illustrate one embodiment of the invention. FIG. 1B is a cross-sectional view of the AMLCD 10 of FIG. 1A taken along the line 1B–1B in FIG. 1A. As shown in FIGS. 1A, 1B, the AMLCD 10 includes an front LCD portion 12 and a backlight 14. Backlight 14 supplies light to the front LCD portion 12. As in other AMLCDS, front LCD portion 12 includes LCD cells, the light transmittance through which is controlled by voltages applied across a layer of LCD material. The front LCD portion 12 includes a transparent face plate 22. For a color display, a layer of color filters 24 is employed, where adjacent rows of color filters are separated by a black matrix layer 28. An array of column electrodes 26 is placed over the color filter layer 24. The front LCD portion also includes a two-terminal switch comprising a conductive wire 30 having a semiconductor and/or substantially insulating layer 32 over it. In other words, layer 32 may be a semiconductor layer, an insulating layer or a composite layer comprising an insulating sublayer 30a and a semiconductor sublayer 30b, shown in FIG. 1C. Alternatively, layer 30a may be a semiconductor sublayer and 30b may be an insulating sublayer.

Preferably, wire 30 includes tantalum (Ta) or chromium (Cr) and layer 32 comprises tantalum oxide ($Ta_2O_5$), which may be formed by anodizing surface portion of a tantalum wire, or by depositing silicon nitride (SiNx) or an organic layer onto the wire. Wire 30 and layer 32 form a wire structure 11 where the wire and/or layer 32 is attached to substrate 34. Layer or coating 32 is preferably attached to a transparent substrate 34 by means of adhesive 36. Preferably, substrate 34 defines grooves 38 therein into which the anodized wire 30 with coating 32 is placed. An array of separated electrodes 40, comprising substantially transparent indium-tin-oxide (ITO), tantalum or chromium or other conductive material, is formed on the substrate 34, where each row of the separated electrodes matches and overlaps a corresponding row of column electrodes in array 26, so that each separated electrode matches and overlaps a corresponding portion of a corresponding electrode in the array of column electrodes 26 to define a LC cell, when viewed by a viewer in the viewing direction 50.

A layer of liquid crystal material 52 (such as TN, STN, or polymer dispersed liquid crystal, etc.) is placed between the two arrays 40, 26, so that when appropriate voltages are applied across a corresponding pair of matching and overlapping portions of electrodes in the two arrays, the light transmittance through the portion of layer 52 between the two electrodes (defining a LC cell) can be controlled as desired. Two layers of polarizers 54 are also employed, one on the outer surface of face plate 22 and the other on the outer surface of substrate 34. By means of color filters 24, a multi-color or a full color image comprising alpha-numeric characters, video image, graphics or any type of monochromatic or color images may be displayed. If the liquid crystal layer is TNLC or STNLC and the like, an alignment layer 27 is preferably employed on both electrodes 26, 40.

FIG. 2A is a perspective view of the two-terminal switch of AMLCD 10 of FIGS. 1A, 1B. As shown in FIG. 2A, each of the separated electrodes in array 40 is preferably formed on substrate 34, where each of the separated electrodes has a portion 40a formed on layer 32, so that wire 30, layer 32 and each of the portions 40a form a diode 13. FIG. 2B is a circuit representation of the switch structure of FIG. 2A and FIG. 1A. The three separated electrodes 40 and their overlapping portions of three corresponding electrodes 26 form three capacitive LC cells shown in dotted lines in FIG. 2B.

In sequentially scanning the device 10 for displaying images, voltages are applied sequentially to the wires 30 for addressing the rows of liquid crystal (LC) cells that overlap such wires. When a first voltage (e.g. ±2 V to ±200 V) is applied across a wire 30 and a row of column electrodes 26 for addressing a row of LC cells overlapping the wire 30, the electrical potentials of portions 40 and 40a across the capacitors are also affected so that layer 32 is of low electrical resistance and diodes 13 conduct. This causes the separated electrodes 40 to be electrically connected to wire 30, so that the desired data signals can be applied to electrodes 26 and corresponding electrodes 40 to control the light transmission through the liquid crystal layer in the LC cells between the electrodes. After the row of LC cells has been scanned as described above, a second voltage (e.g. 0 V to ±30 V) is applied between the wire 30 and electrodes 26 overlapping such cells, so that layer 32 is of high electrical resistance and diodes 13 will not be conducting. The data signals already applied to electrodes 26, 40 therefore will remain substantially unchanged so that the portions of the image displayed at such LC cells will remain intact until they are addressed in the next cycle.

As noted above, an insulating layer 32 may be conveniently formed by anodizing the surface portion of a tantalum wire 30 to form a layer of tantalum oxide 32 at the outer surface of the wire. The tantalum oxide will have the property described above so that wire 30, layer 32 and portion 40a form a diode. Thus, as shown in FIG. 2A, wire 30, layer 32 and portions 40a of the three separated electrodes form three separate diodes 13 that are connected in parallel.

Appropriate electrode potentials are applied to each of the column electrodes 26 that match and overlap the separated electrodes in the array 40 so that adjacent LC cells can have different light transmittances for displaying desired images. In other words, data signals for controlling color and brightness of the display are applied to the column electrodes in array 26 of FIG. 1A. In this manner, the different types of color or monochromatic images referred to above may be displayed.

FIG. 3 is a cross-sectional view of a conventional thin-film diode device of the type used in a conventional TFD-LCD. As shown in FIG. 3, a layer of tantalum 70 is formed on glass 72. The tantalum layer is covered by a thin film of tantalum oxide 74 and a layer of indium-tin-oxide (ITO) 76 is formed on the tantalum oxide layer and the glass substrate. The three layers 70, 74, 76 form a diode for addressing an LC cell. Since the tantalum oxide layer 74 has to be annealed at a high temperature, and the thin films 70, 76 have to be deposited in vacuum, large screens employing thousands of such diodes would be difficult to make with acceptable yield. Moreover, the substrate 72 employed must be able to withstand high temperature so that plastic can not be used for the substrate 72. This invention is based on the observation that, by using a wire and forming the substantially insulating and/or semiconductor layer 32 on the wire as a separate component independently of the substrate, the above-described difficulties for manufacturing the thin-film diode structure of FIG. 3 can be avoided. Since the wire 30 and the semiconductor and/or substantially insulating layer 32 (which can be a composite layer having two sublayers as described above or a layer having the same composition throughout) can be formed separately and apart from the substrate 34 and can be simply attached to the substrate by adhesive, the substrate 34 need not be able to withstand high temperature so that inexpensive material such as plastic may be used for substrate 34. Obviously, other materials such as glass may also be used. Furthermore, the layers involved in the electrode wire structure of FIG. 2A can be formed by processes at room temperature and atmospheric pressure. Thus, the AMLCD of FIGS. 1A, 1B, 2A and 2B is not plagued by yield problems common in large screen AMLCD manufacturing.

FIG. 4A is a cross-sectional view of the active wire two-terminal switch structure of FIG. 2A along the line 4A—4A in FIG. 2A, where a groove in the surface of substrate 34 completely houses the wire structure 30, 32. Instead of employing a groove in substrate 34 that entirely houses wire 30 and layer 32, it is possible for the groove to be shallower, in the manner shown in FIG. 4B. As shown in FIG. 4B, the groove is deep enough to house only about half of wire structure 11. As in the case of FIG. 4A, separated electrode 40' of FIG. 4B is formed on top of the layer 32. Alternatively, no groove needs to be used at all as shown in FIG. 4C, so that layer 32 of the wire structure 11 may simply be attached to a flat surface of the substrate by means of adhesive 36 and a separated electrode 40" is formed on top as shown in FIG. 4C. The separated electrodes can also be formed in different shapes and forms such as illustrated in FIGS. 4D and 4E. As shown in FIG. 4D, the separated electrode 40''' only partially covers the exposed surface of layer 32. In FIG. 4E, even though the separated electrode does substantially cover the entire exposed surface of layer 32, it comprises layer 40 as well as an additional layer 80 of ITO or other conductive layer.

FIG. 5 is a cross-sectional view of different components of the two-terminal wire structure of FIG. 2A to illustrate a process for fabricating the structure. As shown in FIG. 5, a tantalum wire is anodized so that a tantalum oxide layer 32 is formed at the surface of the wire with a core 30 of tantalum. The tantalum oxide layer is annealed at high temperature, such as at a temperature in a range of about 100 to 1000 Centigrade in air or in vacuum. An optional semiconductor layer may be formed on the tantalum oxide layer, if a composite layer having an insulating sublayer and a semiconductor sublayer is to be formed. The groove in substrate 34 is partially filled with an adhesive 36a. The anodized wire 11 is placed in the groove until a large portion of layer 32 is submerged in the adhesive. Adhesive 36a may be cured by UV light 82 supplied to cure the adhesive. The portion 36b of the adhesive which is not exposed to UV light 82 is then removed by a process known to those skilled in the art. Then a layer of conductive material 40 is formed on top of the exposed portion of layer 32 and on substrate 34 at room temperature, or a low elevated temperature such as 20 to 200 degrees Centigrade, and at atmospheric pressure to form the structure of FIG. 2A, by a common semiconductor process such as photoresist masking and etching or screen printing. A layer of LC material and a layer of conductive electrode material are then placed adjacent to the structure so formed as well as other layers to make the AMLCD 10 of FIG. 1A. The alternative structures shown in FIGS. 4B–4E may be formed in a similar manner. Instead of using ultraviolet curable adhesive to attach structure 11 to the substrate, it is also possible to use an adhesive that requires no curing, such as epoxy.

Instead of employing an active wire two-terminal wire structure as shown in FIG. 2A, an active wire three-terminal wire structure can be used instead as illustrated in FIG. 6A. As shown in FIG. 6A, the three-terminal switch structure 100 includes a substrate 34 defining therein a groove 102 similar to the groove in the substrate of FIG. 2A. A conductive wire 30 has a layer of insulating material 104 thereon which may comprise tantalum oxide or silicon nitride or the like. The substantially insulating layer 104 is surrounded by a semiconductor layer 106 which may comprise amorphous silicon (α-Si) polysilicon (poly-Si) or cadmium selenide (CdSe), to form a wire structure 110 comprising the core 30, and layers 104, 106. Groove 102 is partially filled with an adhesive 36 and the wire structure 110 is placed in groove 102 until it is partially submerged in the adhesive in the manner described above for the two-terminal wire structure device of FIG. 2A. The adhesive may be cured by UV light as before and any uncured portions removed in the manner known to those skilled in the art, while leaving a portion of the semiconductor layer 106 exposed as shown in FIG. 6A. A layer of conductive material such as ITO or a metal is then deposited on the selected portions of the semiconductor layer 106 and on substrate 34 to form pairs of electrodes 112a, 114a and 112b, 114b. Obviously, more pairs of such electrodes can be formed, where the electrodes 112a, 112b, . . . , are collectively referred to as electrodes 112, and the electrodes 114a, 114b, . . . , are collectively referred to as electrodes 114. Other adhesives such as epoxy may also be used instead of ultraviolet curable adhesive. FIG. 6B is a circuit representation of the structure of FIG. 6A.

A cross-sectional view of structure 100 along the line 6C—6C in FIG. 6A is shown in FIG. 6C. Thus, wire 30, substantially insulating layer 104, semiconductor layer 106 and electrodes 112 and 114 form a sequence of transistors 111 with electrodes 112, 114 being the sources and drains of the transistors and wire 30 being the common gate. A circuit representation of the structure 100 of the transistors 111 is shown in FIG. 6B. Therefore, by applying a suitable ON voltage to wire 30, the transistors having wire 30 as the gate will all be turned on, and when an OFF voltage is applied to wire 30, then all of the transistors having wire 30 as the gate will be turned off. When the gates of the transistors 111 are turned on, the electrodes 114a, 114b, . . . may be charged to different electrical potentials as desired through the electrodes 112a, 112b, . . . ; and when the gates 30 are then subsequently turned off, electrical potentials at the electrodes 114a, 114b, . . . will stay unchanged despite the change in electric potential on the electrodes 112a, 112b, , , , , until the. common gate 30 is turned on once more. In this manner, adjacent LC cells may be controlled to different levels of light transmittance by applying different electrical potentials to the electrodes 114a, 114b.

In some embodiments, it may be possible to omit the insulating layer 104, or to omit the semiconductor layer 106, and the three terminal device so modified will function essentially as a transistor to control the switching as described above.

FIG. 7 is an elevational view of a portion of an AMLCD 150 employing the three-terminal wire switch device of FIGS. 6A–6C. The AMLCD 150 of FIG. 7 is similar to AMLCD 10 of FIG. 1A, except for the following differences. Instead of a two-terminal wire switch diode, a three-terminal wire switch transistor 111 described above in reference to FIGS. 6A–6C is used instead. Because of this, the row of separated electrodes 114 may be charged to the same or different desired electrical potentials as described above. For this reason, a single common transparent electrode 126 may be employed on the other side of the LC material 52, instead of an array of column electrodes 26 as in FIG. 1A, for constructing the front portion 122 of the AMLCD 150. Thus, the lateral extent of each separated electrode in the array 114 defines a LC cell, since the voltage across each of such separated electrodes (such as 114a, 114b, . . . ) and electrode 126 will control the light transmittance of the portion of the LC layer in between as viewed in the viewing direction 50.

The three-terminal active wire switch structure 100 may be constructed in the manner similar to that of the two-terminal switch structure of FIGS. 4A–4E and 5. The electrodes 112 and 114 may be deposited or otherwise fabricated in a single step to further simplify the fabrication process.

In operation, the two or more wires 30 are used for row scanning to turn on sequentially at least one row of LC cells at a time. When an ON voltage is applied to a wire 30, the desired data signals for controlling brightness and color are then applied to the electrodes 112 in order to charge the electrodes 114 to the desired electrical potentials so as to control the light transmittance through the corresponding LC cells. Then an OFF voltage is applied to the wire 30 to turn off the transistors where the electrodes 114 would stay at the desired electrical potentials originally set until the next time an ON voltage is applied to wire 30. After such row of LC cells has been addressed as described, an ON voltage is then applied to the next wire 30 to repeat the process for the next row of LC cells. This process is then repeated until the entire screen has been addressed and scanned and the process is then repeated to display the same or different image in the next scanning and addressing cycle.

The above-described embodiments are all operated in the transmissive mode, where the electrodes are substantially transparent, and where the viewer essentially sees light from the backlight after that light is transmitted through a front LCD portion. The above-described wire structure and LCD utilizing such structure may also be used in a liquid crystal display that is operated in a reflective mode as shown in FIGS. 8A–8C. The embodiment of FIG. 8A is similar to that of FIGS. 1A and 7 except that the surfaces of electrodes 40 or 114 are provided with a mirror or diffusively reflective surface 170a, so that ambient light beam 172 is reflected by the electrode towards a viewer viewing along direction 50. Alternatively, instead of providing the reflective surface on the electrodes as in FIG. 8A, a separate layer 180 with a mirror or diffusive reflective surface 180a may be employed as shown in FIG. 8B, attached to substrate 34. Ambient light 172 that passes through the LC layer 52 is reflected by surface 180a back towards the viewer viewing along direction 50. By controlling the light transmittance of LC cells in layer 52, a desired image will be observed by the viewer along direction 50. Where the LC layer is any one of the following types: optical absorption LC (e.g. GHLC), optical dispersion LC (e.g. PDLC) or optical selective reflection LC (e.g. polymer stabilized cholesteric LC), polarizer 54 will not be required and is, therefore, omitted in FIG. 8C, which shows a device the same as that of FIG. 8A except for such omission. To form a reflective surface, a thin film of aluminum may be attached onto the desired surface and a diffusively reflective surface may be formed by a puttering or vacuum depositing aluminum.

While the invention has been described by reference to various embodiments, it will be understood that different modifications and changes may be made without departing from the scope of the invention which is to be defined only by the appended claims and their equivalents. For example, while the wire 30 is shown having a cylindrical shape, wires of other shapes and cross-sections may be used, and are within the scope of the invention.

What is claimed is:

1. A liquid crystal display device, comprising:
   a first layer of liquid crystal material;
   at least one first electrode on a first side of the liquid crystal layer;
   at least one conductive wire on a second side of the liquid crystal layer opposite to the at least one electrode;
   at least one substantially insulating or semiconductor second layer over said at least one conductive wire;
   at least one array of electrodes over said second layer;
   said at least one conductive wire, said second layer and said at least one array of electrodes forming a plurality of switches for altering electrical potential or potentials of the electrode array; and
   means for turning the switches on and off, and for applying an electrical signal to the at least first electrode, to affect light transmittance of the liquid crystal layer.

2. The device of claim 1, wherein said at least one conductive wire, said first layer and said electrode array form a plurality of diodes.

3. The device of claim 2, said device comprising at least one row of column electrodes on said first side of the liquid crystal layer.

4. The device of claim 3, said array of electrodes overlapping said row of column electrodes in a viewing direction to define a row of liquid crystal cells.

5. The device of claim 3, further comprising a transparent substrate, wherein said at least one conductive wire is supported on said substrate, said row of column electrodes comprising separated transparent electrodes.

6. The device of claim 5, wherein said electrode array forms a conductive third layer extending over the substrate.

7. The device of claim 1, said second layer being an insulating layer, said device further comprising at least one semiconductor layer between the at least one second layer and the electrode array wherein said at least one conductive wire, the at least one second layer, the at least one semiconductor layer and the electrode array form a plurality of transistors.

8. The device of claim 7, said electrode array comprising at least one conductive layer, wherein extent of at least some of the electrodes in the array defines liquid crystal cells.

9. The device of claim 1, further comprising a transparent substrate having a groove on a surface, wherein said at least one conductive wire is in the groove of said substrate.

10. The device of claim 1, further comprising a transparent face plate, said at least one first electrode on said first side being a transparent electrode over said face plate.

11. The device of claim 1, further comprising two polarizers.

12. The device of claim 1, further comprising a color filter array.

13. The device of claim 1, further comprising a back light.

14. The device of claim 1, said device having a reflective surface.

15. The device of claim 14, said reflective surface being the surface of the at least one conductive layer.

16. The device of claim 15, wherein said at least one conductive layer is a defusing reflector or a mirror reflector.

17. The device of claim 1, wherein said at least one array of electrodes are transparent, said device further comprising a defusing reflector for reflecting light through said at least one array.

18. The device of claim 1, wherein said liquid crystal first layer comprises a polymer dispersed on liquid crystal.

19. A method for making a liquid crystal display, comprising the steps of:
   providing at least one conductive wire;
   forming a substantially insulating and/or semiconductor first layer on said at least one wire;
   attaching said at least one wire and/or the first layer to a substrate;
   forming an electrode array over said at least one first layer; and
   placing a liquid crystal second layer and an electrode third layer adjacent to said electrode array.

20. The method of claim 19, wherein said first layer forming step includes anodizing said wire and annealing the anodized wire.

21. The method of claim 20, said annealing step annealing the wire in a temperature in a range of about 100 to 1000 degrees Centigrade.

22. A liquid crystal display device, comprising:
   a layer of liquid crystal material;
   at least one electrode on one side of the liquid crystal layer;
   an array of switches on the side of the liquid crystal layer opposite to the at least one electrode, said switches comprising at least one electrode array and at least one wire coupled to the at least one electrode array; and
   means for applying electrical potentials to the at least one electrode and the at least one wire.

23. The device of claim 22, further comprising a substrate supporting said at least one wire, said wire formed independently of and attached to said substrate, said substrate comprising plastic or glass.

24. The device of claim 22, said switches including two terminals or three terminals, said wire and said electrode array forming two of the terminals of the switches.

25. The device of claim 22, further comprising a back light.

26. The device of claim 22, the at least one wire coupled to the at least one electrode array so that, when a first voltage is applied to the at least one wire, the switches are turned on to charge said electrode array to desired voltages, and when a second voltage is applied to the at least one wire, the switches are turned off so that said electrode array remains at said desired voltages.

27. A electro-optic display device, comprising:
   a first layer of electro-optic material;
   at least one first electrode on a first side of the electro-optic layer;
   at least one conductive wire on a second side of the electro-optic layer opposite to the at least one electrode;
   at least one substantially insulating or semiconductor second layer over said at least one conductive wire;
   at least one array of electrodes over said second layer;
   said at least one conductive wire, said second layer and said at least one array of electrodes forming a plurality of switches for altering electrical potential or potentials of the electrode array; and
   means for turning the switches on and off, and for applying an electrical signal to the at least first electrode, to affect light transmittance of the electro-optic layer.

28. A method for making a electro-optic display, comprising the steps of:

provic at least one conductive wire;

forming a substantially insulating and/or semiconductor first layer on said at least one wire;

attaching said at least one wire and/or the first layer to a substrate;

forming an electrode array over said at least one first layer; and placing a electro-optic second layer and an electrode third layer adjacent to said electrode array.

29. A electro-optic display device, comprising:

a layer of electro-optic material;

at least one electrode on one side of the electro-optic layer;

an array of switches on the side of the electro-optic layer opposite to the at least one electrode, said switches comprising at least one electrode array and at least one wire coupled to the at least one electrode array; and means for applying electrical potentials to the at least one electrode and the at least one wire.

* * * * *